(12) United States Patent
Ina (10) Patent No.: US 7,951,454 B2
(45) Date of Patent: May 31, 2011

(54) RESIN-COATED SAND

(75) Inventor: Yoshimitsu Ina, Wakayama (JP)

(73) Assignee: Kao Corporation, Tokyo (JP)

( * ) Notice: Subject to any disclaimer, the term of this patent is extended or adjusted under 35 U.S.C. 154(b) by 969 days.

(21) Appl. No.: 11/597,057

(22) PCT Filed: May 19, 2005

(86) PCT No.: PCT/JP2005/009598
§ 371 (c)(1),
(2), (4) Date: Feb. 27, 2007

(87) PCT Pub. No.: WO2005/113174
PCT Pub. Date: Dec. 1, 2005

(65) Prior Publication Data
US 2008/0274374 A1    Nov. 6, 2008

(30) Foreign Application Priority Data

May 21, 2004 (JP) ................................ 2004-152509
Feb. 9, 2005 (JP) ................................ 2005-032999

(51) Int. Cl.
 *B32B 5/66* (2006.01)
(52) U.S. Cl. ......... 428/403; 428/407; 428/508; 427/221
(58) Field of Classification Search ............ 428/407, 428/508, 403; 427/221
See application file for complete search history.

(56) References Cited

U.S. PATENT DOCUMENTS

| 4,923,520 A | 5/1990 | Anzai et al. |
| 6,335,097 B1 * | 1/2002 | Otsuka et al. .............. 428/407 |
| 2006/0005937 A1 * | 1/2006 | Sakaguchi et al. ........... 164/15 |

FOREIGN PATENT DOCUMENTS

| EP | 0972628 | * | 1/2000 |
| EP | 0972628 A1 | | 1/2000 |
| EP | 1595617 | * | 11/2005 |
| EP | 1595617 A1 | | 11/2005 |
| EP | 1652828 A1 | | 5/2006 |
| EP | 844877 | * | 10/2007 |
| EP | 1844877 A1 | | 10/2007 |
| GB | 1327616 | | 8/1973 |
| JP | 59-73143 A | | 4/1984 |
| JP | 04-367349 A | | 12/1992 |
| JP | 10-166106 A | | 6/1998 |
| JP | 2000-24750 A | | 1/2000 |
| JP | 2003-191043 A | | 7/2003 |
| JP | 2003-251434 A | | 9/2003 |
| JP | 2004-202577 A | | 7/2004 |

OTHER PUBLICATIONS

English language abstract of JP 2004-202577-A (Jul. 22, 2004).
English language abstract of JP 2003-251434-A (Sep. 9, 2003).

* cited by examiner

*Primary Examiner* — Leszek Kiliman
(74) *Attorney, Agent, or Firm* — Birch, Stewart, Kolasch & Birch, LLP (57) ABSTRACT

The present invention provides resin-coated sand containing spherical molding sand with a binder composition, the spherical molding sand having an average particle diameter of 0.02 to 1.5 mm and being produced by a flame fusion method.

21 Claims, 3 Drawing Sheets

RESIN-COATED SAND

FIELD OF THE INVENTION

The present invention relates to resin-coated sand used in a casting mold for cast steel, cast iron, aluminum, copper and alloys thereof.

BACKGROUND OF THE INVENTION

A shell mold process, which is a casting mold making method that involves filling, in a preheated die, resin-coated sand having molding sand coated with phenol resin etc. and then thermosetting the resin, is widely used in the field of foundry. As the molding sand serving as aggregate for resin-coated sand, silica sand is widely used, but because of its indefinite shape and inferior fluidity, there is a limit to cope with filing in a core shape increasingly complicated in recent years. Further, because silica sand is highly thermally expansible, it is problematic in respect of dimensional accuracy.

As a means to solve these problems, use of spherical molding sand produced by granulation-sintering has also been proposed, but the resulting molding sand is porous with low sphericity. Accordingly, this molding sand, when formed into resin-coated sand, is poor in fluidity and filling properties and inferior in an effect of improving the roughness of the surface of cast metal. For improvement in this respect, JP-A 2003-251434 proposes that a molten material is air-pulverized to produce spherical molding sand, and this spherical molding sand attains higher sphericity and smoother surface than those of molding sand produced by the sintering method, but is still unsatisfactory. JP-A 2004-202577 discloses spherical molding sand produced by a flame fusion method, and describes a molding method wherein the spherical molding sand is combined with furan resin and alkali phenol resin.

SUMMARY OF THE INVENTION

The present invention relates to resin-coated sand containing spherical molding sand coated with a binder composition, the spherical molding sand having an average particle diameter of 0.02 to 1.5 mm and being produced by a flame fusion method.

The present invention also relates to resin-coated sand containing spherical molding sand coated with a binder composition, the spherical molding sand having an average particle diameter of 0.02 to 1.5 mm and a water absorption of 0.5 wt % or less.

Further, the present invention provides a mold obtained by using the resin-coated sand of the present invention, a casting produced by using the mold, and a method of producing a mold by using the resin-coated sand of the present invention.

Furthermore, the present invention provides the use of the resin-coated sand in producing a mold.

DETAILED DESCRIPTION OF THE INVENTION

The present invention provides resin-coated sand which is excellent in fluidity and capable of producing a high-strength casting mold having smooth surface.

Also there is desire for resin-coated sand which can be preferably used in multilayered mold making method, as a casting method attracting attention in recent years. In this method, however, it cannot be said that resin-coated sand conventionally proposed is satisfactory in respect of mold strength and an ability to discharge unhardened sand.

The present inventors found that resin-coated sand using spherical molding sand that is refractory particles having a specific composition and particle diameter with high sphericity and smooth surface reducing water absorption can exhibit excellent performance as molding sand, and the present invention was thereby completed. According to the present invention, there is provided resin-coated sand containing spherical molding sand coated with a binder composition. The inventors found that this resin-coated sand is suitable for a material of molds used in production of cast steel and cast iron cast at high temperatures.

According to the present invention, there is obtained resin-coated sand which is excellent in fluidity and capable of producing a high-strength casting mold having a smooth surface. The resin-coated sand of the present invention can endure casting at high temperatures and can be used preferably in producing cast steel and cast iron. Also, the resin-coated sand of the invention is low-expanding thus preventing casting defects (veining and mold cracking) in castings attributable to expansion of sand thereby coping with the demand for dimensional accuracy of complicated castings.

The present invention provides resin-coated sand suitable for the shell mold process.

Further, the resin-coated sand of the present invention makes use of spherical molding sand having a smooth surface to attain excellent sand washout and to allow the surface to be coated with resin added in a smaller amount and can, upon formation into a mold, exhibit excellent adhesion to attain high mold strength. Accordingly, the amount of gas generated upon decomposition of resin can be reduced at the time of casting, so high-quality castings can be produced. Further, it is economical. The resin-coated sand of the present invention is excellent in fluidity to allow it to be highly and uniformly filled in forming a mold. The resin-coated sand is also excellent in disintegration after casting. By virtue of these excellent characteristics, the resin-coated sand of the present invention can be satisfactorily substituted for expensive zircon sand and ceramic sand used as special sand in a foundry.

<Spherical Molding Sand>

The spherical molding sand used for the resin-coated sand of the present invention includes two major embodiments. The sand in the first embodiment is spherical molding sand having an average particle diameter of 0.02 to 1.5 mm, produced by a flame fusion method. The sand in the second embodiment is spherical molding sand having an average particle diameter of 0.02 to 1.5 mm and a water absorption of 0.5 wt % or less. Hereinafter, these 2 kinds of sand are sometimes referred to collectively as "spherical molding sand".

The spherical molding sand of the present invention is distinctly characterized by having a specific composition, a specific average particle diameter, and high sphericity. By this constitution, the molding sand is made excellent in fluidity and capable of producing a high-strength casting mold having a smooth surface. The molding sand can produce a mold with a smaller amount of resin than conventional and can be easily reclaimed.

The term "spherical" as used in the spherical molding sand of the invention refers to a sphericity of 0.88 or more, preferably 0.90 or more. Whether the molding sand is spherical or not can be judged by observing the sand under an optical microscope or a digital scope (for example, VH-8000 manufactured by Keyence Corporation) as described later in the Examples.

The major component of the spherical molding sand of the present invention is not particularly limited and may be a conventionally known refractory or refractory material rendered spherical by the flame fusion method. From the viewpoint of refractoriness and availability, the spherical molding sand is preferably sand containing $SiO_2$ as a major component, sand containing $Al_2O_3$ and $SiO_2$ as major components, or sand containing $MgO$ and $SiO_2$ as major components, among the refractory and refractory material. Among these, the molding sand containing $Al_2O_3$ and $SiO_2$ as the major components is particularly preferable from the viewpoint of refractoriness and thermal expansion.

As used herein, the "major components" are component contained in a total amount of 60 wt % or more, preferably 80 wt % or more, based on the whole components of the molding sand. From the viewpoint of improvement of refractoriness, the total amount of the major components is preferably 85 to 100 wt %, more preferably 90 to 100 wt %, based on the whole component of the spherical molding sand.

Components which can be contained as those other than the major component in the spherical molding sand of the invention include, for example, metal oxides such as $CaO$, $Fe_2O_3$, $TiO_2$, $K_2O$ and $Na_2O$. These components are derived from the starting material.

When $Fe_2O_3$ and $TiO_2$ are contained, the content of each of them is preferably 5 wt % or less. The content of $Fe_2O_3$ is more preferably 2.5 wt % or less, even more preferably 2 wt % or less. When $K_2O$ and $Na_2O$ are contained, their content as the total amount is preferably 3 wt % or less, more preferably 1 wt % or less.

When $Al_2O_3$ and $SiO_2$ are used as the major components, the $Al_2O_3/SiO_2$ ratio by weight is preferably 1 to 15. The ratio is more preferably 1.2 to 12, even more preferably 1.5 to 9, from the viewpoint of improvement of the refractoriness and reclamation efficiency of the molding sand. When $Al_2O_3$ and $SiO_2$, or $SiO_2$ only, is used as the major component, $CaO$ and $MgO$ can be contained as components other than the major component. In this case, their total content is preferably 5 wt % or less, from the viewpoint of improvement of the refractoriness of the spherical molding sand.

When $MgO$ and $SiO_2$ are used as the major components, the $MgO/SiO_2$ ratio by weight is preferably 0.1 to 10. The ratio is more preferably 0.2 to 9, even more preferably 0.3 to 5, from the viewpoint of easiness in rendering sand spherical, corrosion resistance, refractoriness and the efficiency of reclamation of the molding sand.

When $MgO$ and $SiO_2$ are the major components, $Al_2O_3$ can be contained as a component other than the major components. This component is derived from the starting material, and its content is preferably 10 wt % or less from the viewpoint of improvement of the corrosion resistance of the spherical molding sand.

The average particle diameter (mm) of the spherical molding sand of the invention is in the range of 0.02 to 1.5 mm. When the average particle diameter is 0.02 mm or more, preferably 0.05 mm or more, the molding sand can reduce the amount of resin to produce a mold and can be easily reclaimed as molding sand. On one hand, an average particle diameter of 1.5 mm or less is preferable because the void volume of the resulting mold is reduced thus leading to improvement of mold strength. The average particle diameter is preferably 0.05 to 1.5 mm, more preferably 0.075 to 1.5 mm, from the viewpoint of increasing the efficiency of reclamation of the spherical molding sand, or is preferably 0.05 to 1 mm, from the viewpoint of increasing mold strength. From the viewpoint of increasing both reclamation efficiency and mold strength, the average particle diameter is preferably 0.05 to 1 mm, more preferably 0.05 to 0.5 mm, even more preferably 0.05 to 0.35 mm. The average particle diameter of the finally obtained RCS of the present invention is also preferably in the same range as defined above.

The average particle diameter can be determined as follows: That is, when the sphericity of the spherical molding sand is 1 as determined from a projected section of the sand particle, the diameter (mm) is measured, while in the case of the sphericity<1, the major axis diameter (mm) and the manor axis diameter (mm) of the spherical molding sand particle are measured to determine (major axis diameter+minor axis diameter)/2. In this measurement, arbitrary 100 spherical molding sand particles are measured and the average value is determined as average particle diameter (mm). The major axis and minor axis are defined as follows: The particle is stabilized on a plane, and when an image, projected on the plane, of the particle is sandwiched between 2 parallel lines, the minimum particle width expressed by the distance between the parallel lines is referred to as minor axis, while the distance between 2 parallel lines perpendicular to the above parallel line is referred to as major axis.

The major and minor axes of the spherical molding sand particle can be determined by image analysis of an image (photograph) of the particle obtained by an optical microscope or a digital scope (for example, VH-8000 manufactured by Keyence). The sphericity is determined by image analysis of the resulting image to determine the area of a projected section of the particle and the circumference of the section and then calculating [circumference (mm) of a circle having the same area as the area ($mm^2$) of the projected section of the particle]/[circumference (mm) of the projected section of the particle], wherein arbitrary 50 spherical molding sand particles are measured to determine their average as sphericity.

From the viewpoint of improving the fluidity of RCS, the sphericity of the spherical molding sand of the present invention is preferably 0.95 or more, more preferably 0.98 or more, even more preferably 0.99 or more. The sphericity of the finally obtained RCS of the present invention is also preferably in the same range as defined above. Accordingly, the spherical molding sand in the first embodiment of the invention is preferably spherical molding sand produced by the flame fusion method, containing, for example, $Al_2O_3$ and $SiO_2$ as the major components at an $Al_2O_3/SiO_2$ ratio of 1 to 15 by weight and having an average particle diameter of 0.02 to 0.5 mm and a sphericity of 0.95 or more.

The spherical molding sand in the first embodiment of the invention is obtained by the flame fusion method. Therefore, the spherical molding sand is structurally characterized by high sphericity and density. Such structural characteristics make a significant contribution to improvement of fluidity, mold strength, and the surface smoothness of produced castings.

From the viewpoint of improving mold strength and suppressing an increase in the amount of resin due to absorption of the resin into the molding sand in producing a mold, the water absorption (wt %) of the spherical molding sand of the present invention is preferably 3 wt % or less, more preferably 0.8 wt % or less, even more preferably 0.5 wt % or less, even more preferably 0.3 wt % or less. The water absorption can be measured according to a water absorption measurement method for aggregate in JIS A1109. In the case of RCS coated with a binder or when a binder remains after casting, such components are removed by a suitable method such as thermal treatment (for example 1000° C. or more) prior to measurement of water absorption.

On one hand, the water absorption of the spherical molding sand in the second embodiment of the invention is 0.5 wt % or less. From the viewpoint of improving mold strength and suppressing an increase in the amount of resin due to absorption of the resin into the molding sand in producing a mold, the water absorption is preferably 0.3 wt % or less, more preferably 0.1 wt % or less.

Given the same sphericity, the water absorption of the spherical molding sand produced by the flame fusion method is usually lower than that of sand produced by other sintering method than the flame fusion method.

The major component of the spherical molding sand in the second embodiment of the invention is the same as in the spherical molding sand in the first embodiment, and from the viewpoint of refractoriness and thermal expansion, the spherical molding sand is particularly preferably sand containing $Al_2O_3$ and $SiO_2$ as the major components wherein the $Al_2O_3/SiO_2$ ratio by weight is preferably 1 to 15.

When the sphericity of the spherical molding sand of the present invention is 0.98 or more, such spherical molding sand can be contained in an amount of preferably 50 wt % or more in a mixture with known molding sand (for example, silica sand) poor in fluidity in order to allow the molding sand containing the mixture to exhibit the desired effect of the invention. That is, when the spherical molding sand of the present invention is gradually added to the known molding sand described above, the desired effect of the invention can be exhibited depending on the amount of the spherical molding sand added, and when the spherical molding sand of the present invention having the above-defined sphericity is contained in an amount of 50 vol % or more in the molding sand containing the above mixture, the effect becomes significant. The content of the invented spherical molding sand having a sphericity of 0.98 or more in the molding sand containing the above mixture is more preferably 60 vol % or more, more preferably 80 vol % or more. Accordingly, the spherical molding sand of the present invention is particularly preferably the one having a sphericity of 0.98 or more because of its superior applicability. Molding sand containing 50 wt % or more of such spherical molding sand can exhibit the same effect as that of the spherical molding sand of the present invention, and can thus fall within the scope of the present invention.

As described above, the spherical molding sand in the first embodiment of the invention is produced by the flame fusion method. On one hand, the spherical molding sand in the second embodiment of the invention can be produced by a method known in the art, such as a granulation sintering method or an electric fusion atomizing method, but is produced particularly preferably by the same flame fusion method as in the first embodiment of the invention. Accordingly, a method of producing the spherical molding sand of the invention by the flame fusion method is described below.

The spherical molding sand of the present invention can be obtained by a production method including a step wherein powder particles containing $Al_2O_3$ and $SiO_2$ as the main components at an $Al_2O_3$ and $SiO_2$ ratio of 0.9 to 17, having an average particle diameter of 0.05 to 2 mm, are used as the starting material, and the powder particles are made spherical by fusion in flame.

The phrase "$Al_2O_3$ and $SiO_2$ as the major components" means that $Al_2O_3$ and $SiO_2$ are contained in a total amount of 80 wt % or more based on the whole components of the powder particles as the starting material. It follows that insofar as the powder particles have "$Al_2O_3$ and $SiO_2$ as the major components", the powder particles may consist of a mixture of a starting material as $Al_2O_3$ source and a starting material as $SiO_2$ source as described later, may consist of a sole starting material as $(Al_2O_3+SiO_2)$ source, or may consist of a mixture of a starting material as $Al_2O_3$ source and/or a starting material as $SiO_2$ source and a starting material as $(Al_2O_3+SiO_2)$ source.

The total content of $Al_2O_3$ and $SiO_2$ as the major components in the powder particles as starting material is preferably 75 wt % or more, more preferably 80 wt % or more, even more preferably 85 to 100 wt %, even preferably 90 to 100 wt %, from the viewpoint of allowing the total content of $Al_2O_3$ and $SiO_2$ in the resulting spherical molding sand to be 80 wt % or more based on the whole components. The $Al_2O_3/SiO_2$ weight ratio is 0.9 to 17, preferably 1 to 15, from the viewpoint of allowing the $Al_2O_3/SiO_2$ weight ratio in the resulting spherical molding sand to be 1 to 15. The average particle diameter is 0.05 mm or more from the viewpoint of obtaining monodisperse spherical molding sand, or is 2 mm or less from the viewpoint of obtaining molding sand having the desired sphericity, and is thus 0.05 to 2 mm from both the viewpoints. From the viewpoint of improving the sphericity of the resulting molding sand, the average particle diameter is preferably 0.05 to 1.5 mm.

The starting powder particles and the resulting spherical molding sand are different in respect of $Al_2O_3/SiO_2$ weight ratio because the amount of escaping $Al_2O_3$ and the amount of escaping $SiO_2$ are different from each other depending on the starting material used. The average particle diameter of the starting powder particles may be in the above-defined range because although amorphous shape powder decreases its particle diameter when made spherical, the particle diameter of the originally spherical powder does not change.

To obtain the spherical molding sand of the present invention, the powder particles used as the starting material are prepared in consideration of evaporation of the components upon fusion such that the $Al_2O_3/SiO_2$ weight ratio and the average particle diameter can be in the ranges defined above.

When water is contained in the powder particles as the starting material, the water is evaporated from the powder particles upon fusion, so that as water is evaporated, a large number of pores are formed in the resulting molding sand. Formation of such pores causes an increase in water absorption and a decrease in sphericity. Accordingly, the water content (wt %) of the starting material is preferably 10 wt % or less, more preferably 3 wt % or less, even more preferably 1 wt % or less, from the viewpoint of suitably regulating the water absorption and sphericity of the resulting spherical molding sand. The water content is determined in terms of loss in the quantity of 10 g powder particles after heating at 800° C. for 1 hour.

The starting material can be selected from, for example, mineral materials and synthetic materials having refractoriness. The starting material as $Al_2O_3$ source includes bauxite, alumina-shale, aluminum oxide, aluminum hydroxide etc. The starting material as $SiO_2$ source includes silica rock, silica sand, quartz, cristobalite, amorphous silica, feldspar, pyroferrite etc. The starting material as $(Al_2O_3+SiO_2)$ source includes kaolin, alumina-shale, bauxite, mica, sillimanite, andalusite, mullite, zeolite, montmorillonite, halloysite etc. These starting materials can be used alone or as a mixture of two or more thereof. The selected starting material is used preferably after calcination for reducing the water content thereof or to fuse easily. The calcined starting powder particles can be exemplified by calcined alumina-shale, sintered mullite, calcined bauxite, a mixture of calcined aluminum hydroxide and kaolin or the like.

In a step of rendering the powder particles as starting material spherical by fusion in flame, the starting material described above is dispersed in a carrier gas such as oxygen and introduced into flame to fuse the starting material thereby making it spherical (flame fusion method). In a preferable embodiment, the starting material is introduced into flame described below.

The flame used is generated by burning, with oxygen, fuels such as propane, butane, methane, natural liquefied gas, LPG, heavy oil, kerosene, light oil and powdered coal. From the viewpoint of complete combustion, the ratio of the fuel to oxygen is preferably 1.01 to 1.3 in terms of volume ratio. From the viewpoint of generating high-temperature flame, an oxygen/gas burner is preferable. Although the structure of the burner is not particularly limited, burners disclosed in JP-A 7-48118, JP-A 11-132421, JP-A 2000-205523, or JP-A 2000-346318 can be mentioned.

For making spherical particles from the fire-resistant starting powder having a large average particle diameter in the range of 0.05 to 2 mm used in the production method of the present invention, the following method is suitably used.

Introduction of the powder particles into flame is performed by dispersing them in a carrier gas. As the carrier gas, oxygen is preferably used. In this case, oxygen in the carrier gas can be advantageously consumed for fuel burning. From the viewpoint of securing the sufficient dispersibility of the powder particles, the density of the powder in the gas is preferably 0.1 to 20 kg/Nm$^3$, more preferably 0.2 to 10 kg/Nm$^3$.

In introduction into flame, it is preferable that the powder particles have been passed through a mesh, a static mixer etc. in order to improve dispersibility.

The shape and composition of the starting powder particles are selected preferably from the viewpoint of rapidly rendering the particles spherical and obtaining monodisperse spherical molding sand. The major axis/minor axis ratio of the starting powder particle is preferably 9 or less, more preferably 4 or less, even more preferably 2 or less, from the viewpoint of securing retention time in flame and rapidly fusing the particles to make them spherical. The $Al_2O_3/SiO_2$ weight ratio is particularly preferably in the range of 1.5 to 10, from the viewpoint of obtaining monodisperse spherical particles which are not fusion-bonded to one another.

The powder particles can also be made spherical preferably by fusion in plasma jet flame generated by ionization of $N_2$ inert gas etc.

The particle density (g/cm$^3$) of the spherical molding sand of the invention is preferably in the range of 1 to 3.5 g/cm$^3$, from the viewpoint of using the sand in producing a casting mold. When a mold of a higher strength is desired, the density of the particles is preferably in the range of 2.5 to 3.5 g/cm$^3$. A solid, dense and high-strength mold can be obtained with the particles falling in this range. When a light mold is desired, the density of the particles is preferably in the range of 1 to 2.5 g/cm$^3$. The particles in this range give a light mold that is porous with voids in the inside. The density of the particles can be measured according to a particle density measurement method in JIS R1620.

The spherical molding sand of the present invention is preferably low-expansive sand having preferably a refractoriness of SK17 (1480° C.) or more, more preferably a refractoriness of 1800° C. or more, even more preferably SK37 (1825° C.). The upper limit, though not particularly limited, is preferably SK42 (2000° C.) or less. This refractoriness was measured according to the Seger cone method in accordance with JIS R 2204.

The spherical molding sand of the present invention has a smaller surface area than that of polygonal granular aggregate, spherical aggregate having a porous surface and spherical aggregate inferior in sphericity, and can thus be coated with resin added in a smaller amount. When the molding sands are bonded to one another via the coating resin to produce a mold, the surface of the molding sands is so smooth that excellent adhesiveness can be attained even with a small amount of the resin, thus attaining high mold strength. As a result, the molding sand can maintain strength sufficiently durable to the pressure of a metal upon casting and exhibit excellent disintegration after casting.

<Binder Composition>

The RCS of the present invention contains the spherical molding sand of the invention coated with a binder composition.

The binder composition used in the present invention contains a resin and can contain a disintegration accelerator, a lubricant, a silane coupling agent, a curing agent etc. if necessary. The resin is not particularly limited insofar as it is a resin having a property of maintaining the bonding among the molding sands upon casting and disintegrating the bonding of the molding sands after casting. For example, the resin used in the present invention includes, but is not limited to, phenol-based resin, urea-based resin, melamine-based resin, unsaturated polyester-based resin, epoxy-based resin, diallyl phthalate-based resin, polyurethane-based resin, silicon-based resin, polyimide-based resin, and furan-based resin. Among these resins, novolak resin or phenol-based resin such as resol resin is preferable. When a metal to be cast at high temperatures is used (for example, iron is cast usually at a temperature of 1300 to 1600° C.), a resin having the above properties even at such temperatures is particularly preferably used.

Preferable properties of the resin are that it is solid at the time of introduction into a die and melted by action such as heating etc. to bind the molding sands to one another. Generally, the melting point and solid content of the resin after coating are preferably regulated such that the fusing point of the resulting RCS (JACT Test Method C-1) comes to be in the range of 50 to 200° C., particularly 80 to 120° C. To attain such characteristics, it is preferable to employ a resin having a melting point (JACT Test Method RS-1) of preferably 50 to 150° C., more preferably 60 to 90° C.

The content of the resin in the binder composition of the present invention is preferably 10 to 100 wt %, more preferably 50 to 98 wt %, even more preferably 60 to 90 wt %, based on the total solid content.

A conventionally known disintegration accelerator may be contained. Examples of the disintegration accelerator include metal oxides such as those of cobalt and nickel, various nitrates, phosphorus compounds, borate compounds such as triethyl borate and tributyl borate, carboxylates, etc.

As the lubricant, calcium stearate, ethylene bis-stearic acid amide, etc. can be used. In respect of the fluidity of RCS and the strength of a mold obtained by the shell mold process, it is preferable that when a lubricant is used in the binder composition and the resin is phenol resin, the lubricant is contained in an amount of 0.2 to 7 parts by weight based on 100 parts by weight of the phenol resin.

As the silane coupling agent, γ-glycidoxypropyl trimethoxy silane, γ-aminopropyl triethoxy silane etc. can also be used. In respect of the strength and disintegration of the resulting mold, it is preferable that when a silane coupling agent is used in the binder composition and the resin is phenol resin, the silane coupling agent is contained in an amount of 0.01 to 10 parts by weight based on 100 parts by weight of the phenol resin.

For improving the strength of a mold obtained by the shell mold process and for increasing the curing rate of the binder, a curing agent may be contained in the binder composition, and particularly hexamethylene tetramine may be contained in phenol resin. When hexamethylene tetramine is contained, its content is preferably 5 to 20 parts by weight based on 100 parts by weight of the phenol resin, from the viewpoint of the disintegration of the resulting mold.

The amount of the binder composition used in the present invention may be the minimum amount necessary for the resin in the composition to bond the spherical molding sands to one another. That is, the binder composition is used in such an amount as not to deteriorate disintegration after casting. Specifically, the amount of the resin added (in terms of solid content) is preferably 3 to 0.5 part by weight, more preferably 2.5 to 0.5 part by weight, based on 100 parts by weight of the spherical molding sand of the present invention.

The method of coating the spherical molding sand of the present invention with the binder composition includes, but is not limited to, conventionally known methods such as a dry hot method, semi-hot method and cold method. The dry hot method is preferably used in the present invention because the amount of the coating resin can be reduced. The components of the binder composition may be used as one agent type composition containing all the components or may be used separately.

More specifically, the coating method includes the same procedures as in the dry hot method that is a standard of JACT resin-coated sand manufacturing operation according to Japanese Association of Casting Technology. That is, when a binder composition containing phenol resin as the resin is used, the molding sand of the invention is heated at a temperature of 130 to 160° C., and then the binder composition is added to, and kneaded in, the molding sand thereby melting the binder composition (resin in the composition). Then, the temperature of the molding sand is decreased between 100 and 110° C., and a curing agent such as hexamethylene tetramine, paraformaldehyde or trioxane in the form of an aqueous solution for example is added to and kneaded with the molding sand and solidified thereby coating the sand with the resin, followed by further kneading the sand thereby disintegrating the kneaded material into single particles, whereby the RCS of the present invention can be obtained. After the curing agent is added, a lubricant is added preferably in the stage where the kneaded material comes to be disintegrated into single particles. When resol resin is used, the curing agent is not always necessary, and the RCS coated with the resin according to the invention can be obtained by mere heating.

The RCS of the present invention can be used as a material of a mold for producing a casting. As spherical molding sand having a smooth surface is used for the RCS of the present invention, the molding sand can be coated with the small amount of resin to be excellent in adhesiveness and produce a high strength mold. Production of a high-quality casting can be made with a small amount of decomposition gas, generated from the resin during casting.

Since the RCS is excellent in fluidity, thus improving filling into a mold even to fine parts, a core or a hollow core having a complicated shape can be produced. It is particularly suitable for production of a hollow core.

The RCS of the invention can efficiently produce a mold such as a core having a thin-walled portion, and because of high fluidity, prevent imperfect filling for a mold (particularly a core) having a thin-walled portion of 5 mm or less in thickness, preferably 4 mm or less. The mold having a thin-walled portion of 5 mm or less represents a mold whose thinnest portion has a thickness of 5 mm or less after forming.

The surface roughness Ra of the mold of the present invention is preferably 20 µm or less, more preferably 1 to 15 µm. Ra can be measured with a surface roughness measuring instrument described later in the Examples.

As a shell core used in casting, a hollow core that is a core made hollow in the inside thereof is produced in some cases for solving a problem of gas purging upon casting in the case of a solid core, reducing the amount of RCS used, improving operativeness by reducing the weight of the core, and facilitating removal of sand from a casting. The core can be made hollow by filling RCS in a heated core die, then heating the core die to form a hardened external layer of predetermined thickness, and discharging the internal unhardened RCS. The method of discharging the internal unhardened RCS includes a method of overturning the die and dropping RCS by gravitation (method of sand washout by overturning), a method further using vibration in the above method thereby accelerating dropping of RCS (method of sand washout by vibration), a method of discharging the unhardened RCS by blowing it away with compressed air (method of sand washout by air-blowing), a method of discharging the unhardened RCS by suction through a suction nozzle (method of sand washout by suction), and a method wherein the method of sand washout by air-blowing and the method of sand washout by suction are carried out simultaneously.

The mold (e.g. the core) of the invention can be used to obtain a casting having a surface roughness, Ra, of preferably 8 µm or less, more preferably 5 µm or less, and can be used preferably in producing a casting composed of cast steel, cast iron, aluminum, copper, magnesium or an alloy thereof. In the present invention, the amount of the resin added can be reduced thereby reducing the amount of gas generated from the mold, which is preferable for materials severe toward defects by gas, such as copper, aluminum and magnesium. Ra can be measured with a surface roughness measuring instrument described later in the Examples.

The casting of the invention can also be used as a casting having the most complicated structure and requiring a beautiful surface and dimensional accuracy. Specific examples of the casting include parts, members etc. used in construction machine hydraulic valves, motors, dies, engine frames, metal cutting machine tools, building components, etc., particularly parts etc. in driving transmission devices such as piping parts, fin portions or complicated motor parts (casings), and pump parts requiring smoothness (impellers etc.).

The mold-making method using the RCS of the invention is generally the shell mold process but includes other thermosetting mold-making methods, among which the shell mold process is desirable. That is, the RCS of the invention is molding sand for producing a thermosetting mold and is particularly preferable as molding sand for a shell mold.

Because the molding sand of the invention is spherical with a smooth surface, RCS produced from the molding sand is highly fluidic to prevent breakage or failure to fill in a mold having a more complicated shape. The spherical molding sand of the invention can be coated with a smaller amount of resin, and the resulting RCS can formed into a mold having excellent adhesiveness and high mold strength. As described above, the spherical molding sand and RCS according to the invention can be used alone or in suitable combination with conventionally known molding sand such as silica sand or refractory aggregate, RCS obtained therefrom, or conventionally known additives. Such RCS is spherical and excellent in fluidity and can thus be preferably used in lamination by a multilayerd mold making method (for example, Japanese Patent Application National Publication (Laid-Open) No. 2004-508941 and JP-A 2000-24750).

RCS provided conventionally in the multilayerd mold making method consists of molding sand coated with a binder composition, wherein the molding sand is amorphous to render the shape of RCS uneven, thus causing a problem of infeasible dense spreading of RCS. A large amount of resin is necessary for attaining mold strength after curing, to cause a problem of defects by gas upon casting of a casting material into the mold. Accordingly, spherical synthetic sand is used in RCS, but the sphericity of such conventional synthetic sand is insufficient, so the surface smoothness cannot be said to be sufficient, and thus spreading of RCS is insufficient and a larger amount of resin is necessary for attaining mold strength. After a mold is formed by multilayerd molding, unhardened RCS should be discharged, but the RCS is poor in fluidity for discharging from a mold having a complicated shape. These problems can be solved by the RCS of the invention.

When the particle diameter of the spherical molding sand used in the multilayerd mold making method is too large, the surface of the resulting sand layer is significantly uneven thus failing to attain mold accuracy, while when the particle diameter of the molding sand is too small, the surface of the sand layer can be made less uneven, but when the molding sand is coated with a binder composition, the molding sand is hardly uniformly kneaded with the binder composition, and the discharge of generated gas upon casting is significantly difficult. From these viewpoints, the average particle diameter of the spherical molding sand is 0.02 to 1.5 mm, more preferably 0.02 to 1 mm, even more preferably 0.04 to 0.08, even more preferably 0.04 to 0.07.

The average particle diameter of the spherical molding sand when used in the multilayerd mold making method is 0.02 to 1.5 mm, but from the viewpoint of improving the accuracy of the resulting mold, the particle-diameter distribution of the spherical molding sand is preferably narrower.

The thermal expansivity of the spherical molding sand when used in the multilayerd mold making method is preferably lower. This is because the thermal expansion of the spherical molding sand upon heating by irradiation with heat ray can be prevented to improve the accuracy of a mold to be made, and during casting, the warpage of the mold attributable to thermal deformation, or the cracking of the core, can be prevented.

The multilayerd mold making method preferably includes a step of spreading the RCS of the invention to form a thin sand layer and a step of irradiating the sand layer with heat ray to harden the binder composition, wherein the spreading and irradiating steps are repeated alternately to laminate the sand layers in the direction of thickness to produce a mold.

The source of heat ray is preferably an electric heater, a laser beam or the like. When RCS is irradiated with heat ray, the binder composition is melted and then thermal-set to bind adjacent molding sands to one another. Accordingly, the resin in the binder composition is thermosetting resin such as phenol resin. The laser beam used in the irradiating step can be selected from, for example, $CO_2$ laser, YAG laser etc. and may be a visible or invisible laser beam.

In consideration of securing the accuracy of a mold made by the multilayerd mold making method, the resin is preferably the one allowing the fusion temperature of RCS to be 100° C. or more. After a mold is formed, the sand in the unhardened layer is discharged and a hollow generated by discharging the unhardened sand is charged with the sand not coated with the binder composition, followed by heating the whole of the mold, thereby progressing and completing thermosetting of the mold. Even in this method, the unhardened RCS is excellent in an ability to be discharged, because of the nearly circular shape of the RCS and a smaller amount of the coated binder composition.

As described above, the mold produced from the RCS of the invention is a high-strength mold with a smaller amount of resin than in the counterpart the same strength produced from conventional RCS. Accordingly, the RCS of the invention is economical and can be efficiently reclaimed for reuse as molding sand. The mold obtained from the RCS of the invention can solve the problems of mold cracking after casting, veining, and burned stick, and the surface of the mold is so smooth that the surface of the resulting casting is made smooth to reduce the burden on a polishing step as the poststep. The mold can be easily disintegrated by vibration or the like after casting.

EXAMPLES

The present invention is described in more detail by reference to the following examples. The Examples are merely illustrative of the present invention and not intended to limit the present invention.

<Production of Molding Sand>

In molding sands in Table 1, Invented Product 1, sintered mullite sand and electromelted sand were obtained respectively by the following methods.

(1) Invented Product 1

Mullite powder containing $Al_2O_3$ and $SiO_2$ at an $Al_2O_3/SiO_2$ weight ratio of 2.7 in a total amount of 96 wt % with a water content of 0 wt %, an average particle diameter of 0.21 mm and a major axis diameter/minor axis diameter ratio of 1.5 was used as the starting material, and the powder was introduced with oxygen as carrier gas into flame (about 2000° C.) in LPG (propane gas) burning at a ratio of 1.1 to oxygen (volume ratio) to give monodisperse spherical molding sand (Invented Product 1 in Table 1).

(2) Sintered Mullite Sand

Aluminum hydroxide and kaolin were mixed such that the $Al_2O_3/SiO_2$ weight ratio became 2.7, and then the mixture was made spherical by a spray drier to give powder particles (containing 96% by weight of $Al_2O_3$ and $SiO_2$ in a total amount which were then sintered in an electric furnace at 1500° C. for 1 hour to give spherical molding sand (Sintered mullite sand in Table 1).

(3) Electromelted Sand

Synthetic mullite containing alumina and silica was fused as the starting material in an arc furnace and melted at a temperature of 1600 to 2200° C. and then air-pulverized by an electric fusion atomizing method to give spherical molding sand (Electromelted sand in Table 1).

Examples 1 to 2 and Comparative Examples 1 to 4

(1) Production of RCS

The molding sand obtained above and flattery silica sand were used as the molding sand. Their chemical composition etc. are shown in Table 1. In Table 1, the flattery silica sand is conventional amorphous silica sand, and the sintered mullite sand and Electromelted sand correspond respectively to conventional spherical molding sand.

The molding sand in Table 1 and the components in a binder composition shown in Table 2 were used in the ratio shown in Table 2 to produce RCS. Specifically, the molding sand was heated at 15° C. and then 1.0 part by weight of phenol resin (AV Right, Asahi Organic Chemicals Industry Co., Ltd.) was added to, and kneaded with, 100 parts by weight of the molding sand. Then, the temperature was decreased to 105° C., and at this temperature, 0.83 part by weight (or 0.15 part by weight in terms of solid content) of an aqueous solution of hexamethylene tetramine (curing agent) (concentration: 18 wt %) was added to, and kneaded with, 100 parts by weight of the molding sand, and while cooling air was blown into it, the mixture was further kneaded. To increase fluidity, 0.05 part by weight of calcium stearate (lubricant) was added to, and kneaded with, 100 parts by weight of the molding sand to give RCS.

In Example 2, the RCS in Example 1 was formed into a mold by the shell method, then the mold was calcined at 1000° C. for 30 minutes and the resulting sand was used as calcined and reclaimed sand. RCS in Comparative Example 4 was produced in the same manner as above except that 0.8 part by weight of phenol resin and 0.66 part by weight of the aqueous solution of hexamethylenetetramine (concentration: 18 wt %) were used. In Comparative Example 4, the amount of phenol resin per unit volume of RCS was reduced to the same extent as in Example 1 etc.

(2) Evaluation

The RCSs produced above were measured for fineness number, sphericity, a rate of thermal expansion to 1000° C., fluidity, and transverse strength of a mold made therefrom by the shell method. The results are shown in Table 3. The amount of the resin per unit volume of RCS is also shown in Table 3.

RCS was cured at 250° C. for 90 seconds as a test specimen for evaluation of transverse strength. The transverse strength was measured according to JIS K-6910 method. The density of this test specimen is also shown in Table 3.

The rate of thermal expansion to 1000° C. was measured with a thermal expansion measuring meter. The sphericity was determined by photographing RCS under a microscope and analyzing its image. The fluidity was evaluated by placing RCS in a 100-ml cup, then introducing this 100-ml RCS into a cone of a bulk specific gravity measuring device in JIS K-6721, and allowing the RCS to fall down to measure its falling time.

TABLE 1

| Molding-sand | Chemical composition (weight %) | | | Average particle diameter (mm) | Water absorption (wt %) | Sphericity |
| --- | --- | --- | --- | --- | --- | --- |
| | $SiO_2$ | $Al_2O_3$ | $Fe_2O_3$ | | | |
| Invented product 1 | 26 | 70 | — | 0.195 | 0.01 | 0.99 |
| Flattery silica sand | 99 | — | — | 0.220 | 0.9 | 0.84 |
| sintered mullite sand | 26 | 70 | — | 0.202 | 1.4 | 0.91 |
| Electrically fused sand | 16 | 75 | 5 | 0.241 | 0.6 | 0.97 |

TABLE 2

| | |
| --- | --- |
| Molding sand | 100 parts by weight |
| Phenol resin | 1.0 parts by weight |
| Hexamethylene tetramine | 0.15 parts by weight |
| Water | 0.67 parts by weight |
| Calcium stearate | 0.05 parts by weight |

TABLE 3

| | | Kind | Sphericity | Rate of thermal expansion to 1000° C. (%) | Fluidity (sec) | Density of test specimen (g/cm³) | Amount of resin per volume (g/cm³) | Transverse strength (MPa) |
| --- | --- | --- | --- | --- | --- | --- | --- | --- |
| Example | 1 | Invented product 1 | 0.99 | 0.2 | 7.7 | 1.65 | 0.017 | 8.9 |
| | 2 | calcined reclaimed sand of invented product 1 | 0.99 | 0.2 | 8.0 | 1.70 | 0.017 | 9.0 |
| Comparative example | 1 | sintered mullite sand | 0.91 | 0.2 | 8.8 | 1.61 | 0.016 | 3.4 |
| | 2 | Flattery silica sand | 0.84 | 1.5 | 9.3 | 1.54 | 0.015 | 2.5 |
| | 3 | Electrically fused sand | 0.97 | 0.4 | 8.4 | 2.07 | 0.021 | 8.8 |
| | 4 | Electrically fused sand | 0.97 | 0.4 | 8.3 | 2.10 | 0.017 | 6.0 |

From the results in Table 3, the RCS of the invention is highly fluidic to achieve excellent filling in minute shapes to produce a mold. This is considered due to the high sphericity and smooth surface of the spherical molding sand of the invention.

The RCS in Example 1 has higher transverse strength than that of the RCSs other than in Comparative Example 3. The amount of the resin per volume to exhibit the same transverse strength is smaller in the RCS in Example 1 than in Comparative Example 3, thus indicating that the RCS in Example 1 is advantageous over that in Comparative Example 3. Accordingly, the amount of gas generated at the time of casting can be reduced to reduce gas defects in the resulting casting. This is an effect considered attributable to such high sphericity and smooth surface of the spherical molding sand of the invention as to enable realization of sufficient casting strength with a smaller amount of resin.

Examples 3 to 4 and Comparative Examples 5 to 6

The molding sand in Table 1 was coated with resin in the same manner as in Example 1 to afford RCS which was then used in a composition shown in Table 4 to produce a mold, and the mold was examined in a casting test. A test core mold using the RCS was cured at 250° C. for 90 seconds. The test core was set in a separately produced main mold, and a melt of casting iron (FC200) at about 1470° C. was poured into it. The cast iron was cooled (allowed to stand for about 2 hours after the casting had been finished). The mold cracking was then observed. Thereafter, the mold was disintegrated by core knock and the resulting casting surface in contact with the core was observed in view of veining and burning. Results are shown in Table 4. In the item "Mold cracking" in Table 4, "○" means no generation of mold cracking, and "x" means generation of mold cracking. In the item "Veining", "○" means no generation of veining, "Δ" means slight generation of veining, and "x" means generation of veining. In the item "Burned stick", "○" means no generation of burned stick, and "x" means generation of burned stick.

(1) Production of RCS

Invented Product 2 in Table 5, that is, spherical molding sand obtained by the same production method (flame fusion method) as for Invented Product 1 in Table 1, and sintered mullite sand B in Table 5, obtained by the sintering method, were used. RCS was produced therefrom in the same manner as in Example 1 etc. except that the components shown in Table 6 were used in the amounts shown in Table 6. Phenol resin B in Table 6 is novolak type phenol resin to permit the fusion temperature of RCS to be 110° C. This fusion temperature was measured according to JACT Test Method C-1 (fusion point test method).

(2) Evaluation
(2-1)
The same method as in Example 1 was used to measure transverse strength.
(2-2)
RCS was spread thinly on an installation surface to form a sand layer. The thickness of the sand layer was 1 mm. After the spreading step was finished, a light-shielding mask was arranged over the sand layer, followed by carrying out a step of irradiating the sand layer via the light-shielding mask with thermic ray from an electric heater. In the sand layer, the resin in the region irradiated directly with thermic ray was thermally set to bond the sand particles to one another to form a solidified layer. In the sand layer, the binder composition in the region not irradiated with hot ray remained unhardened.

Figure 1:
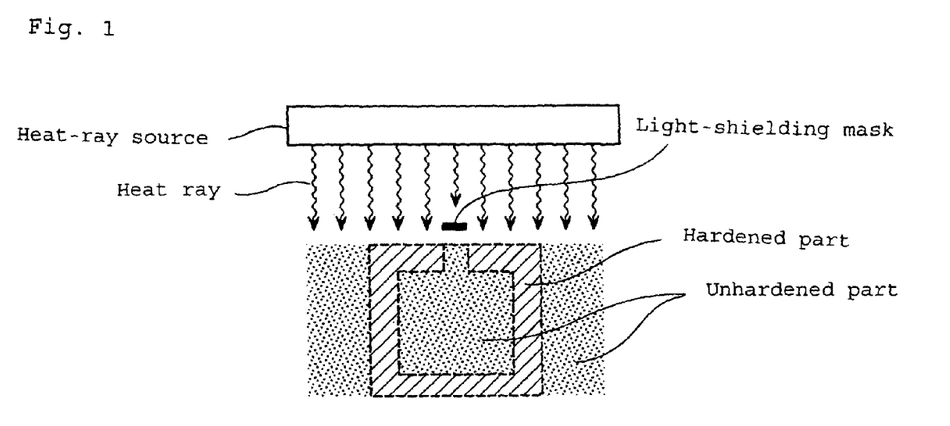
FIG. 1 is a view schematically showing a multilayerd mold making method carried out in Example 5 etc.
Figure 2:
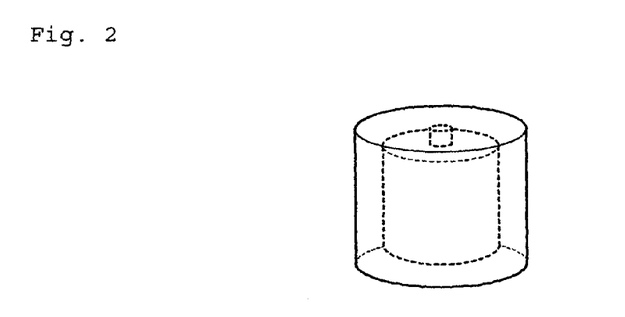
FIG. 2 is a view schematically showing a mold obtained in a multilayerd mold making method carried out in Example 5 etc.

By repeating the spreading step and irradiating step alternately, the resulting solidified layers were laminated in the direction of depth, to shape a casting mold as a shaped product (FIG. 1). About 50 layers were laminated to give a mold of 30 mm in diameter and 30 mm in thickness having a cylindrical cavity as shown in FIG. 2.

Figure 3:
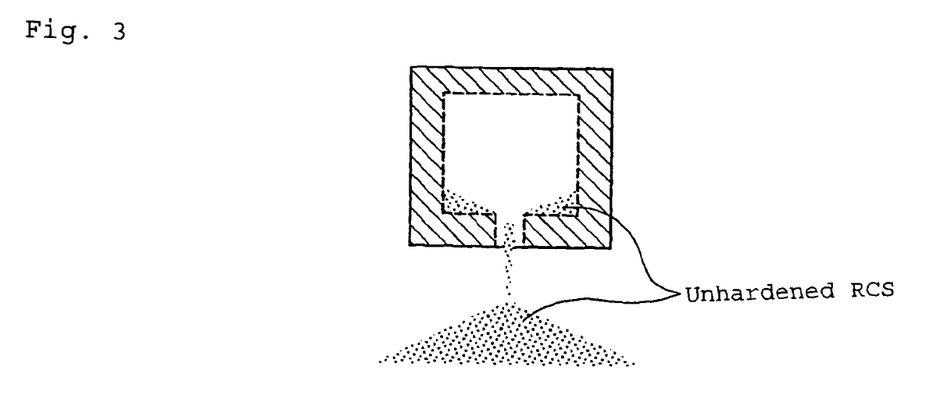
FIG. 3 is a view schematically showing a method of evaluating sand washout as carried out in Example 5 etc.

The resulting mold was overturned whereby unhardened RCS in the cylindrical cavity was discharged by gravitation through an unhardened portion of 10 mm in diameter, and the weight (A) of the discharged RCS was measured. Thereafter, the mold was split and the weight (B) of unhardened RCS remaining in the inside was measured. 100×A/(A+B) was regarded as sand washout (%) (FIG. 3).

TABLE 4

| | | Molding sand (parts by weight) | | | Molding defects | | |
|---|---|---|---|---|---|---|---|
| | | Invented product 1 | Flattery silica sand | Electrically fused sand | Mold cracking | Veining | Burning |
| Example | 3 | 100 | 0 | 0 | ○ | ○ | ○ |
| | 4 | 50 | 50 | 0 | ○ | ○ | ○ |
| Comparative | 5 | 0 | 100 | 0 | X | X | ○ |
| example | 6 | 0 | 0 | 100 | ○ | Δ | ○ |

Example 5 and Comparative Examples 7 and 8

RCS was produced by the following method and evaluated by the following method. The results are shown in Table 6.

TABLE 5

| | Chemical composition (wt %) | | | Average particle diameter | Water absorption | |
|---|---|---|---|---|---|---|
| Molding sand | SiO$_2$ | Al$_2$O$_3$ | Fe$_2$O$_3$ | (mm) | (wt %) | Sphericity |
| Invented product 2 | 26 | 70 | — | 0.070 | 0.1 | 0.99 |
| sintered mullite sand B | 26 | 70 | — | 0.070 | 1.0 | 0.88 |

Invented Product 2 was a product having particle-size distribution regulated through a sieve, and assuming that the whole of the molding sand is 100%, the sand having a particle diameter of 50 μm to less than 75 μm accounts for about 60% by weight, and the sand having a particle diameter of 75 μm to less than 100 μm accounts for about 40% by weight. From this proportion, the particle diameter of Invented Product 2 is estimated to be in the range of 50 to 100 μm.

TABLE 6

| Molding sand | Kind | Example 5 | Comparative example 7 | Comparative example 8 |
|---|---|---|---|---|
| | | Invented product 2 | sintered mullite sand B | sintered mullite sand B |
| | parts by weight | 100 | 100 | 100 |
| Phenol resin B | parts by weight (relative to 100 parts by weight of casting sand) | 2.0 | 2.0 | 4.0 |
| Hexamethylene tetramine | Parts by weght (relative to 100 parts by weight of phenol resin B) | 15 | 15 | 15 |
| Calcium stearate | Parts by weight (relative to 100 parts by weight of casting sand) | 0.1 | 0.1 | 0.1 |
| Mold transverse strength (MPa) | | 8.0 | 4.4 | 8.2 |
| Sand washout (%) | | 85 | 80 | 75 |

In Example 5, the RCS showed higher sand washout than in Comparative Examples 7 and 8, and the unhardened RCS could be easily discharged. Facilitation of the discharge by vibration or suction can be easily anticipated.

Example 6 and Comparative Examples 9 and 10

RCS was produced by the following method and evaluated by the following method. The results are shown in Table 7.
(1) Production of RCS
Invented Product 1 and sintered mullite sand in Table were used. RCS was produced therefrom in the same manner as in Example 1 etc. except that in these molding sands, the components shown in Table 7 were used in the amounts shown in Table 7. Phenol resin B in Table 7 is the same as in Example 5 etc.

Figure 4:
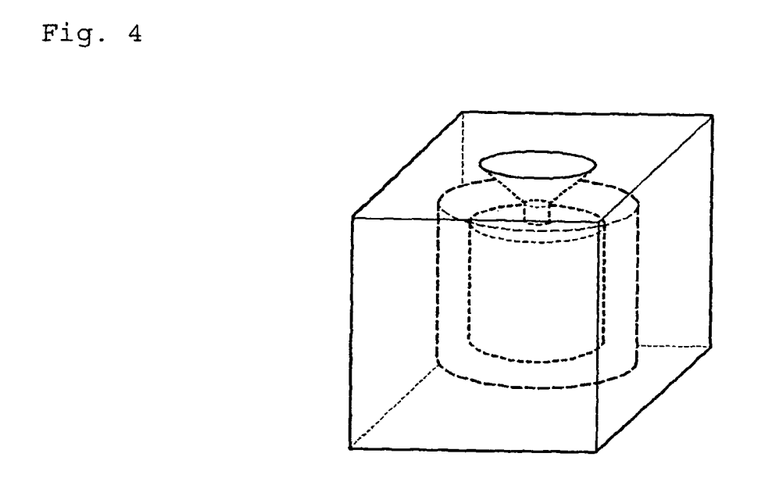
FIG. 4 is a view schematically showing a die for producing a core as used in Example 6 etc.
Figure 5:
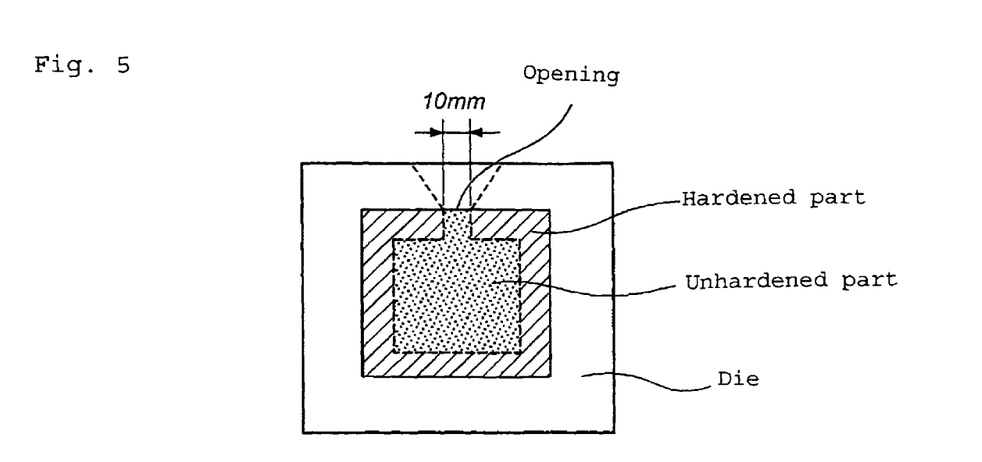
FIG. 5 is a view schematically showing a method of producing a core as carried out in Example 6 etc.
Figure 6:
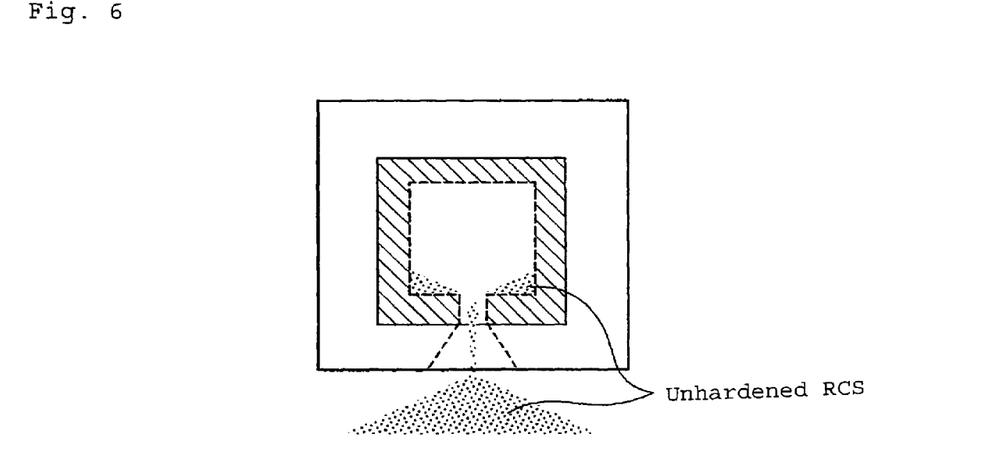
FIG. 6 is a view schematically showing a method of evaluating sand washout as carried out in Example 6 etc.

(2) Evaluation
(2-1)
The same method as in Example 1 was used to measure transverse strength.
(2-2)
A die (split mold) of 50 mm in inner diameter and 50 mm in depth, having a cylindrical cavity, as shown in FIG. 4 was heated to 250° C., and RCS was filled through an opening of 10 mm in diameter into the cylindrical cavity and then cured for 30 seconds (FIG. 5). The RCS in the vicinity of the opening was hardened slightly by heat from the die, and thus the opening was drilled with a drill of about 10 mm in diameter, and then the die was overturned whereby the unhardened RCS in the inside was discharged by gravitation through the drilled opening of 10 mm in diameter, and the weight (A) of the discharged RCS was measured (FIG. 6). Thereafter, the resulting mold was split, and the weight (B) of unhardened RCS remaining in the inside was measured. From these weights, sand washout (%) was determined in the same manner as in Example 5 etc.

TABLE 7

| Molding sand | Kind | Example 6 | Comparative example 9 | Comparative example 10 |
|---|---|---|---|---|
| | | Invented product 1 | sintered mullite sand | sintered mullite sand |
| | Parts by weight | 100 | 100 | 100 |
| Phenol resin B | Parts by weight (relative to 100 parts by weght of casting sand) | 2.0 | 2.0 | 4.0 |
| Hexamethylene tetramine | Parts by weght (relative to 100 parts by weight of phenol resin B) | 15 | 15 | 15 |
| Calcium stearate | Parts by weght (relative to 100 parts by weght of casting sand) | 0.1 | 0.1 | 0.1 |
| Mold transverse-strength (MPa) | | 8.1 | 4.5 | 8.2 |
| Sand washout (%) | | 50 | 30 | 25 |

A hollow core using the RCS of the invention facilitates discharge of unhardened RCS and is advantageous for higher accuracy of the shape and dimension of a shaped product and for higher qualities thereof.

Examples 7 and Comparative Example 11

The molding sands in Table 1 were coated with resin in the same manner as in Example 1 and Comparative Example 1 to give RCSs, and the RCSs were used to yield molds. Each of the molds was examined in a casting test. That is, the test core mold was calcined in the same manner as in Example 3, and the test core was set in a separately produced main mold, and aluminum casting (component AC4C) was poured into it. The smoothness of the core mold and the surface of the resulting casting in contact with the core were determined as surface roughness (central line average roughness: Ra) by a surface roughness measuring device (Surfcoater SE-30H, manufactured by Kosaka Kenkyusho). The surface roughness of each of the mold and casting was measured at 5 positions, and the average surface roughness at the 5 positions was determined as Ra. Smaller Ra is indicative of excellent surface smoothness. The results are shown in Table 8.

TABLE 8

|  |  | Example 7 | Comparative example 11 |
|---|---|---|---|
| Molding sand |  | Invented product 1 | sintered mullite sand |
| Surface roughness (Ra) (μm) | Surface of the mold | 13.3 | 21.8 |
|  | Surface of the casting | 2.0 | 8.2 |

Example 8 and Comparative Examples 12 to 13

80 parts by weight of RCS using flattery silica sand were mixed with 20 parts by weight of RCS for mixing shown in Table 9, to give mixed RCS. The RCS using flattery silica sand was prepared in the same manner as in Comparative Example 2, and the RCS for mixing was obtained in the same manner as in Example 1 and Comparative Examples 1 and 3. The mixed RCS produced above was measured in the same manner as in Example 1 for a rate of thermal expansion to 1000° C., fluidity, and transverse strength of a mold made therefrom by the shell method. The results are shown in Table 9.

As shown in Table 9, the RCS of the invention, as compared with the conventional RCS, can be used to improve the fluidity of the RCS for mixing and to increase mold strength even in the case where a small amount of the low thermal expansion RCS is mixed with inexpensive silica sand to improve the rate of thermal expansion.

The invention claimed is:

1. A resin-coated sand comprising spherical molding sand coated with a binder composition, the spherical molding sand having an average particle diameter of 0.02 to 1.5 mm, a water absorption of 0.5 wt% or less and being produced by a flame fusion method, wherein
the spherical molding sand comprises $Al_2O_3$ and $SiO_2$ as major components at an $Al_2O_3/SiO_2$ weight ratio of 1/1 to 15/1.

2. The resin-coated sand according to claim 1, wherein the binder composition comprises phenol resin.

3. The resin-coated sand according to claim 1, which is for use in a multilayered mold making method.

4. A mold obtained by using the resin-coated sand described in claim 1.

5. The mold according to claim 4, wherein the surface roughness Ra is 20 μm or less.

6. The mold according to claim 4, wherein the mold is a core.

7. The mold according to claim 6, wherein the core is a hollow core.

8. A casting produced by using the mold described in claim 4.

9. The casting according to claim 8, wherein the surface roughness Ra is 8 μm or less.

10. A method of producing a mold by using the resin-coated sand described in claim 1.

11. A multilayered mold making method comprising the steps of:
spreading the resin-coated sand of claim 1 to form a thin sand layer; and
irradiating the sand layer with a heat ray to harden the binder composition, wherein the spreading and irradiating steps are repeated alternately to laminate the sand layers in a direction of thickness to produce a multilayered mold.

12. The resin-coated sand according to claim 1, wherein the binder composition comprises 0.5 to 3 parts by weight of a resin in terms of solid content based on 100 parts by weight of the sand.

13. The resin-coated sand according to claim 1, wherein the binder composition comprises 0.5 to 2.5 parts by weight of a resin in terms of solid content based on 100 parts by weight of the sand.

TABLE 9

|  |  | Physical properties of RCS for mixing | | | | |
|---|---|---|---|---|---|---|
|  | Kind of RCS for mixing | Rate of thermal expansion to 1000° C. (%) | Fluidity (sec) | Density of test specimen (g/cm³) | Amount of resin per volume (g/cm³) | Transverse strength (MPa) |
| Example | 8 Invented product 1 (Example 1) | 1.2 | 8.6 | 1.60 | 0.016 | 4.0 |
| Comparative example | 12 Sintered mullite sand (comparative example 1) | 1.2 | 9.0 | 1.55 | 0.016 | 2.8 |
|  | 13 Electrically fused sand (comparative example 3) | 1.3 | 8.8 | 1.66 | 0.017 | 3.5 |

14. The resin-coated sand according to claim 1, wherein the sand has an average particle diameter of 0.070 to 1.5 mm.

15. A resin-coated sand comprising spherical molding sand coated with a binder composition, the spherical molding sand having an average particle diameter of 0.05 to 1.5 mm, a water absorption of 0.5 wt% or less and being produced by a flame fusion method, wherein the spherical molding sand comprises $Al_2O_3$ and $SiO_2$ as major components at an $Al_2O_3/SiO_2$ weight ratio of 1/1 to 15/1.

16. The resin-coated sand according to claim 15, wherein the binder composition comprises phenol resin.

17. The resin-coated sand according to claim 15, which is for use in a multilayered mold making method.

18. A mold obtained by using the resin-coated sand described in claim 15.

19. The mold according to claim 18, wherein the mold is a core.

20. A casting produced by using the mold described in claim 18.

21. A method of producing a mold by using the resin-coated sand described in claim 15.

* * * * *